United States Patent
Neal et al.

[19]

[11] Patent Number: 6,035,438
[45] Date of Patent: Mar. 14, 2000

[54] METHOD AND APPARATUS FOR DEFEATING BALLISTIC PROJECTILES

[76] Inventors: Murray L. Neal, 5816 E. Shields Ave. Suite 111, Fresno, Calif. 93727; Allan D. Bain, 1817 Via Qunito, Oceanside, Calif. 92056

[21] Appl. No.: 09/302,734

[22] Filed: Apr. 30, 1999

[51] Int. Cl.[7] .............................. F41H 1/02; F41H 5/00; B32B 3/06
[52] U.S. Cl. ............................ 2/2.5; 428/101; 89/36.01
[58] Field of Search .......................... 2/2.5; 428/293.1, 428/293.4, 325, 323, 329, 911; 89/36.01

[56] References Cited

U.S. PATENT DOCUMENTS

| | | |
|---|---|---|
| 921,352 | 5/1909 | Blaker et al. . |
| 1,021,804 | 4/1912 | Schneider . |
| 1,282,411 | 10/1918 | Golembiowski . |
| 1,290,799 | 1/1919 | Talley . |
| 1,513,766 | 11/1924 | Spooner . |
| 1,739,112 | 10/1929 | Wisbrod . |
| 3,179,553 | 4/1965 | Franklin . |
| 3,813,281 | 5/1974 | Burgess et al. . |
| 3,829,899 | 8/1974 | Davis . |
| 4,633,756 | 1/1987 | Rudoi ...................................... 89/36.02 |
| 4,648,136 | 3/1987 | Higuchi . |
| 5,196,252 | 3/1993 | Harpell . |
| 5,326,606 | 7/1994 | Labock . |
| 5,443,917 | 8/1995 | Tarry ......................................... 428/545 |
| 5,515,541 | 5/1996 | Sacks et al. ................................. 2/2.5 |
| 5,738,925 | 4/1998 | Chaput .................................... 428/101 |
| 5,824,940 | 10/1998 | Chediak et al. ........................ 89/36.05 |

OTHER PUBLICATIONS

X–2 Promotional Materials; Bain, Allan D.; Jan. 1996.

*Primary Examiner*—Amy B. Vanatta
*Assistant Examiner*—Robert H. Muromoto, Jr.
*Attorney, Agent, or Firm*—Blakely Sokoloff Taylor & Zafman LLP

[57] ABSTRACT

A method and apparatus for defeating high-velocity projectiles. A plurality of disks of equal size comprised of fiber induced ceramic composites are provided. The disks are laid out in an imbricated pattern row by row such that each disk in a row is in substantially a straight line with the other disks in the row and overlaps a segment of a disk in an adjacent row. The imbricated pattern is then adhered to a flexible, high tensile strength substrate and overlaid by a second high tensile strength layer such that the imbricated pattern is enveloped between the substrate and the second layer. The envelope is then coupled to a soft body armor backing.

21 Claims, 2 Drawing Sheets

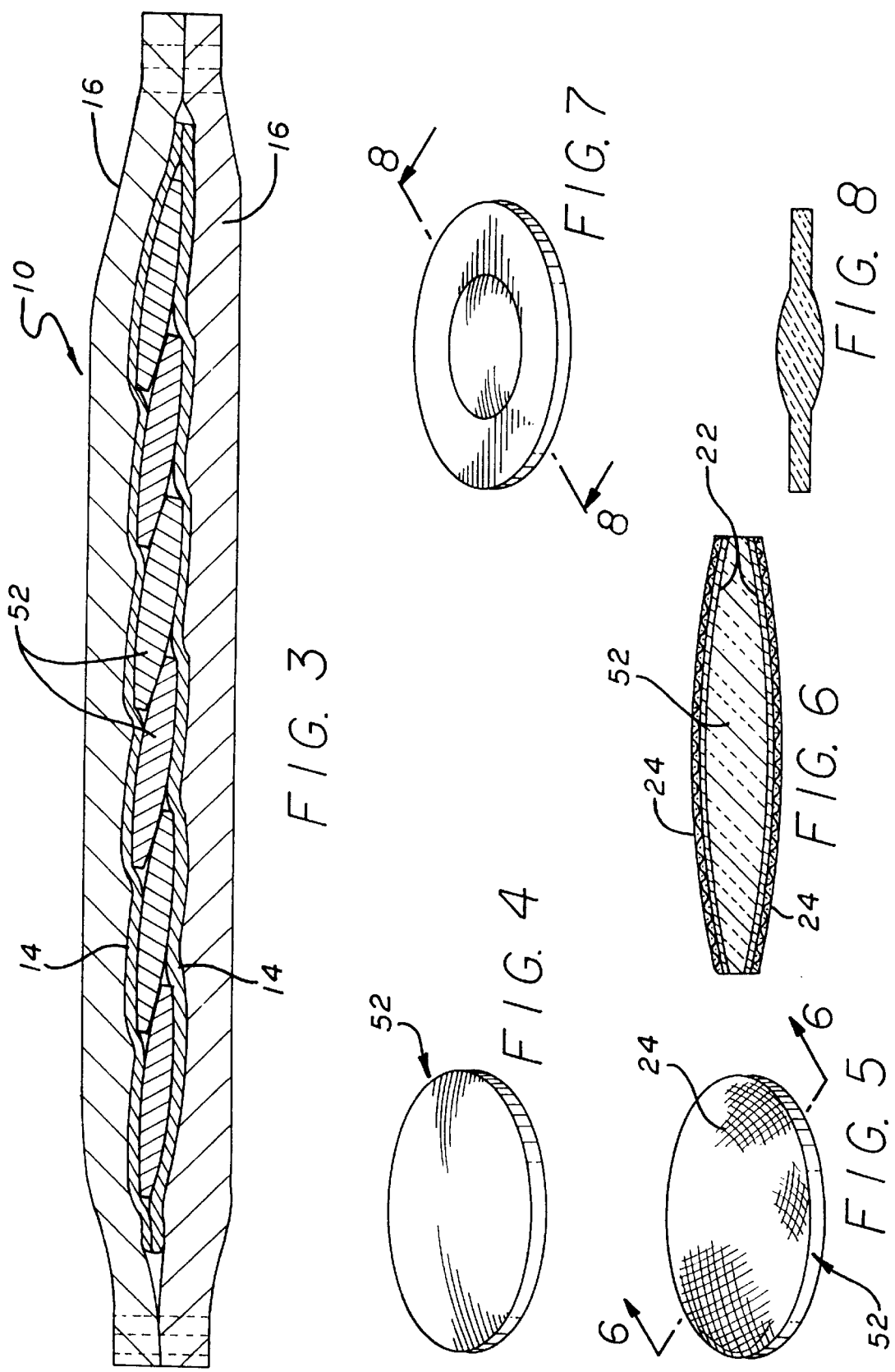

METHOD AND APPARATUS FOR DEFEATING BALLISTIC PROJECTILES

BACKGROUND OF THE INVENTION

1. Field of the Invention

The invention relates to protective wear. More specifically, the invention relates to flexible body armor designed to defeat high-velocity projectiles.

2. Background

Advances in body armor are frequently related to development of improved materials from which the armor is formed. In recent years, ballistic resistant materials formed from high tensile strength fibers, such as aramid fibers or polyethylene fibers, have gone into common use in the field. Unfortunately, soft body armor, even with these advanced materials, has proven insufficient to thwart even armor-piercing pistol ammunition, sharp thrusting implements, and circular penetrators, all of which are now in common use.

To address this problem, various hard metal plating systems have been developed. One such system employs a number of titanium disks one inch in diameter and having a uniform thickness in the range of 0.032–0.050 inches in thickness laid out in overlapping rows such that in the interior of a row, a disk overlaps its predecessor in the row and is overlapped by its successor in the row. Subsequent rows overlap their predecessor and are overlapped by their successor. The coin layout is then attached to a substrate such as adhesive impregnated aramid fabric. A second layer of adhesive impregnated aramid may be used to envelope the "plate" formed by the coins. This enveloped plate can be attached to conventional soft body armor over vital organs. It provides good flexibility and is thin enough to conceal.

While this overlapping of the coins has been shown to spread the force effectively to defeat most existing armor-piercing pistol rounds, sharp thrusting implements, and circular penetrators, unfortunately, rifle rounds continue to tear through this plating structure (even when set out in an imbricated pattern), as well as the underlying soft body armor like a hot knife through butter. Thus, for protection from rifle rounds, users have been required to employ large rigid plates to shield the vital organs. These large plates are heavy and inflexible, and generally uncomfortable to use. Additionally, they are next to impossible to use in a concealed manner. Efforts to employ the coin design with thicker disks have failed to yield a commercially viable product to defeat rifle rounds. Thicker disks result in less flexibility and do not lay out well. The result is a plating structure thicker, no more flexible, and heavier than the solid plates discussed above. Wearer comfort is also a premium concern in body armor production. Accordingly, these limitations make such a structure impractical as a commercial product.

In view of the foregoing, it would be desirable to have a flexible armoring system that would defeat high-velocity projectiles, such as rifle rounds.

BRIEF SUMMARY OF THE INVENTION

A method and apparatus for defeating high-velocity projectiles is disclosed. A plurality of disks of equal size comprised of fiber induced ceramic composites are provided. The disks are laid out in an imbricated pattern row by row such that each disk in a row is in substantially a straight line with the other disks in the row and overlaps a segment of a disk in an adjacent row. The imbricated pattern is then adhered to a flexible, high tensile strength substrate and overlaid by a second high tensile strength layer such that the imbricated pattern is enveloped between the substrate and the second layer. The envelope is then coupled to a soft body armor backing.

BRIEF DESCRIPTION OF THE DRAWINGS

FIG. 3 is a side cutaway cross-sectional view of one embodiment of the body armor.

FIG. 4 is a perspective view of one disk embodiment.

FIG. 5 is a perspective view of the disk embodiment of FIG. 4 with an epoxy modified resin and Eglass coating.

FIG. 6 is a sectional view of the disk embodiment of FIG. 5 illustrating the coatings.

FIG. 7 is a perspective view of one disk embodiment.

FIG. 8 is a sectional view of one disk embodiment.

DETAILED DESCRIPTION OF THE INVENTION

Figure 1:
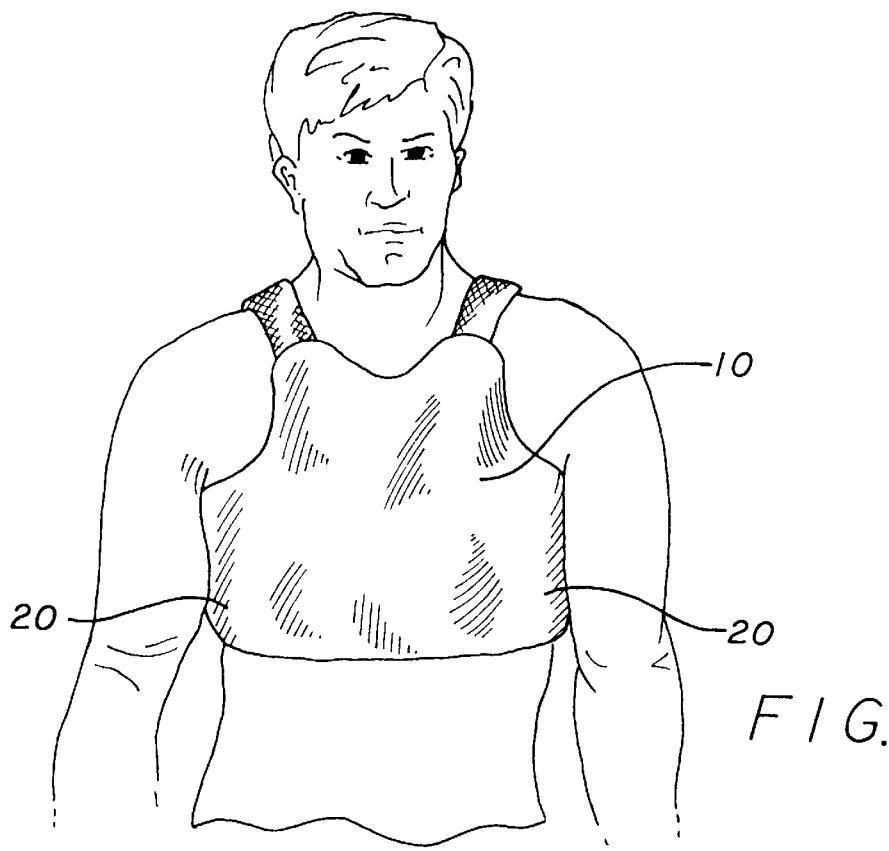
FIG. 1 is a frontal view of one embodiment of body armor.

FIG. 1 is a frontal view of a suit of body armor as worn in one embodiment of the instant invention. The body armor 10 covers a user's torso and is designed to protect the vital areas from high-velocity projectiles. Flaps 20 on the body armor extend around the wearer's body to extend protection to the wearer's sides. In one embodiment the body armor wraps around a segment of the wearer, for instance the torso, providing substantially uniform armor protection in a enveloping circumference.

Figure 2:
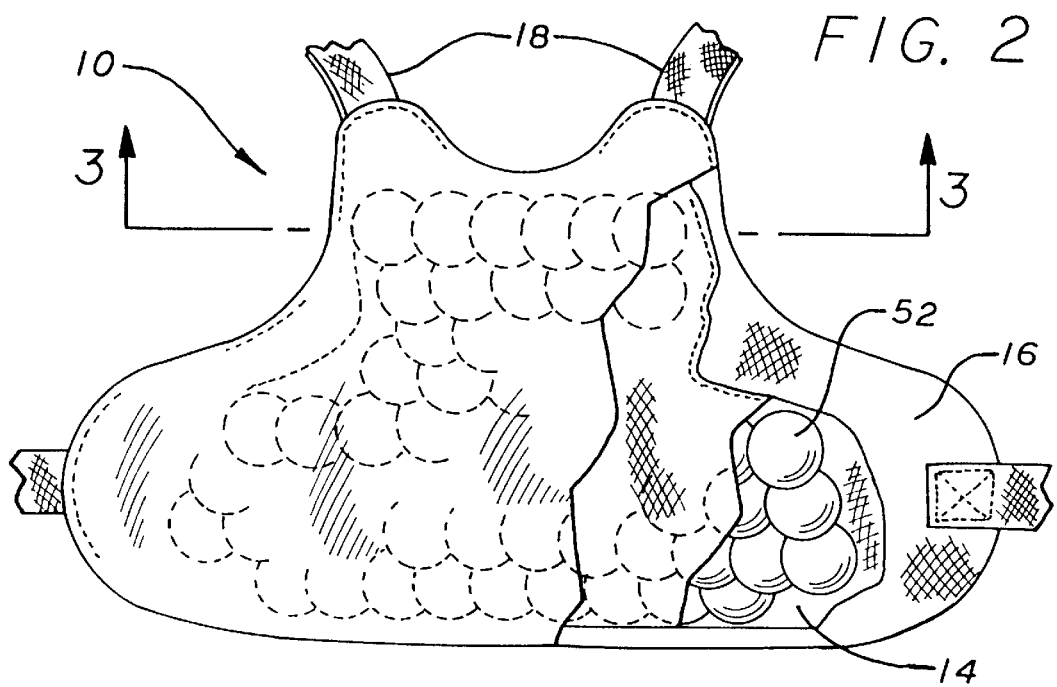
FIG. 2 is a cutaway view of one embodiment of the body armor.

FIG. 2 is a cutaway frontal view of one embodiment of a suit of body armor. Disks 52 are arrayed in an imbricated pattern to cover vital areas where the body armor is worn. Unlike the 10×12 rigid plates of the prior art, the imbricated pattern can flex around body contours and is therefore considerably more comfortable and also more readily concealable. Each disk 52 is formed of a high hardness material. In one embodiment, each disk is discus shaped having a maximum thickness in the center of the disk and declining in thickness towards the outer edge by providing one or more downwardly inclined surface segments. In one embodiment, the thickness of the discus shaped disk declines in a uniform downward inclined slope from the center towards the outer edge. In another embodiment the discus shape has an internal circumference within which the disk is uniformly thick and slopes uniformly downward between the internal circumference and the circumferential edge of the disk.

Typically, the edge thickness will be approximately one-half the thickness in the center. As such, when laid out in the imbricated pattern the disks exhibit a pivot capability which allows on the order of 60% greater flexibility than metal plates or existing coin arrangements. Many such suitable ceramic materials exist which are also of relatively lighter weight when compared to steel or other high hardness metals.

The tapering design intrinsic to the discus shape of one embodiment of the invention renders the disk surface non-planar, providing a slope to deflect ballistic impacts as compared with a uniform flat planar surface. In this regard, the ceramic composite material can be sintered and/or molded into a homogenous ballistic grade discus shape more easily and less expensively than can a metal disk, which must either be lathed or tooled to produce a similar tapering discus form. However, discus shaped metal disks are within the scope and contemplation of the invention. Through appropriately laying out disks in an imbricated pattern, the overall body armor 10 remains flexible and also provides good protection against high velocity projectiles.

Additionally, the lighter weight and greater flexibility of the ceramic composite as compared to prior art protection from high velocity projectiles, allows for greater mobility and range of motion by the wearer. For instance, body armor vests composed of imbricated ceramic disks of ballistic grade hardness and fracture toughness may wrap entirely around a segment of the wearer, for instance the torso, extending disk protection up to 360 degrees about the wearer. The lighter ceramic material also avoids pronounced negative buoyancy of high hardness metal coins or plates typical of prior art body armor. This provides for climbing or swimming uses in the field for which prior art body armor is not suitable.

The imbricated pattern 12 is typically sandwiched between two layers of fabric 14 made of high tensile strength fibers, such as aramid fibers or polyethylene fibers. The fabric 14 should be tear and cut resistant and is preferably ballistic grade material designed to reduce fragmentation. This fabric 14 can be adhesive impregnated, thus, the adhesive on the fabric adheres to the disks that compose the imbricated pattern 12 and retains their relative position. One or more additional layers of the fabric 14 may be added to the sandwich. This will be discussed further below.

Underlying the imbricated pattern of disks 52 that is sandwiched between two or more layers of tear and cut resistant fabric layers 14 is conventional soft body armor 16. A high-velocity projectile is deemed defeated even if it penetrates the disks of the imbricated pattern and all fabric layers if it does not penetrate the underlying soft body armor or cause backside deformation of greater than 1.73", as backside deformation is defined by the National Institute of Justice (NIJ). In one embodiment, multiple layers of fabric are added to the side between the ceramic disks and the wearer as additional protection against backside deformation and to catch projectiles and fragments thereof. Attachment straps, such as strap 18, connect the armor to a body segment, for instance the shoulders, to provide additional support. Attachment strap 18 could be any conventional strapping common in the industry.

To arrange the imbricated pattern, the disks are laid out from left to right. Each subsequent row is also laid out left to right. It has been found that switching from left to right, then to right to left, creates weakness in the resulting pattern that often causes failure. Disks within each row form a substantially straight horizontal line. Because the disks overlap, each disk lies on a slight tilting slope relative to a line normal to the horizontal layout surface. In one embodiment, this slight slope of the disks complements their inclined discus shape to increase the probability of impact deflection.

After the disks are laid out from left to right and top to bottom and sandwiched between a pair of adhesive layers, the entire pattern is inverted for assembly into body armor. It has been found that the majority of threats arrive at a downward trajectory. Thus it is desirable that each row of disks overlap the row below it as the armor is worn. It is, however, within the scope and contemplation of the invention to lay out the disks in an alternative order, e.g. right to left, bottom to top. It is also contemplated that inverting the imbricated pattern in the course of assembling the body armor may be connected such that each row overlaps the row above it.

A number of possible ceramic composites have been found suitable as high hardness materials for the disks. These include fiber induced ceramics sold under the trademarks SINTOX® FA and DERANOX® by Morgan Matroc, Ltd. of Bedforshire, England. In particular, SINTOX® FA alumina oxide ceramic and DURANOX® D995L, for a zirconia toughened alumina oxide ceramic composite, composed of approximately 88% by weight alumina plus approximately 12% by weight transformation toughened zirconia (TTZ), have proven suitable ceramic composites.

While alumina based composites are preferred, other bases may be utilized to form the ceramic composite including barium titanate, strotium titanate, calcium zirconate, magnesium zirconate, silicon carbides and boron carbides. As indicated, these potential ceramic bases are not limited to oxide ceramics but also include mixed oxides, non-oxides, silicates as well as MICATHERM® ceramics, (the latter being a trademark for inorganic thermoplastic materials sold by Morgan Matroc, Ltd. of Bedforshire, England).

Suitable ceramic composites would have relatively high hardness and fracture toughness. Typically, such materials would have at least approximately 12 GPa in hardness and at least 3.5 MPa $m^{1/2}$ in fracture toughness in order for the armor to withstand a level three ballistic event as defined by the National Institute of Justice (NIJ). A level three threat is a full metal jacket 7.62×51 mm 150 grain round traveling at 2700–2800 ft./sec. Ultimately, hardness and fracture toughness levels will depend on the type of ceramic composite employed. For exemplary embodiments of the present invention using alumina bases, the fracture toughness minimum for alumina would be 3.8 MPa $m^{1/2}$ and 4.5 MPa $m^{1/2}$ for zirconia toughened alumina. The hardness for alumina would be in the approximate range of 12 to 15 GPa, and for zirconia toughened alumina, the hardness would be at least approximately 15 GPa.

In certain instances, the ceramics employed may be supplemented by the addition of a toughening agent such as toughened metallic oxides. In one embodiment, TTZ is added to the alumina base. The inclusion of metallic oxides increase the strength of the resulting ceramic composite and resist disassociation of the disk upon impact during a ballistic event. For alumina based ceramic composites, the range of TTZ percentage by weight for suitable ballistic grade ceramics would be between 0.05% and 20%. In one embodiment the percentage of TTZ by weight to the alumina base is approximately 12% of the composite.

The ceramics are mixed in ways commonly known in the art. Sintering and molding, including injection molding, methods to form the disk are well known in the art. In one embodiment, the disks may be formed by injection molding and then pressing to the desired shape. Once formed, certain embodiments of the disks are then encompassed with a containment wrap material. This material provides greater integrity to the disk and increases its fracture toughness, consequently enhancing its ability to absorb the impact of ballistic projectiles without disassociation. In one embodiment, this wrap is a glass fiber wrap adhered by an adhesive substrate. Suitable glass fiber materials include Eglass and S-2 Glass available from Owens Corning Fiberglas Technology, Inc. of Summit, Ill. Suitable adhesives include modified epoxy resins. The containment wrap and epoxy resin substrate can be applied to the disk by autoclaving, or in other ways known to the art. Strength, cohesion and structural integrity may also be imparted by overlaying the disk surface with aramid fibers, layered or cross-laid on an adhesive substrate.

Typically, disk 52 has a radius between ½" and 1". Longer radii reduce flexibility but also manufacturing cost. In a current embodiment, a 1" radius is employed. Each disk tapers in thickness varying between its center region (where the thickness is at its maximum) and its edge (where the thickness is at a minimum). Maximum and minimum thicknesses will vary according to the level of ballistic threat to be defeated. For instance, to defeat a high velocity rifle ballistic threat, a maximum thickness of ⅜" in the center tapering to ³⁄₂₀" minimum thickness at the edge may be used. A low velocity rifle threat (or a high velocity pistol threat) may only require a thickness of between ⅛" (maximum) and ¹⁄₁₀" (minimum). In one embodiment, the discus shaped disks have a center thickness of approximately ¼" and an edge thickness of ⅛".

The overlap of the imbricated placement pattern has been found to effectively spread the force of a high-velocity projectile hit to adjacent disks, thereby preventing penetration and backside deformation. Additionally, because of the slight tilt of each overlapping disk in the imbricated pattern, a perpendicular hit is very unlikely and some of the energy will be absorbed in deflection. In the discus embodiment, the tapering of thickness, forming a non-planar inclined surface renders a perpendicular strike extraordinarily unlikely.

FIG. 3 shows an imbricated pattern of disks 52 coupled to a substrate. As previously discussed, substrate could be an adhesive impregnated polyethylene or aramid fiber fabric. Suitable fabrics include the fabric sold under the trademark SPECTRA® by AlliedSignal of Morristown, N.J., TWARON® microfiliment by Akzo-Nobel of Blacklawn, Ga., SB31 and SB2, sold under the trademark DYNEEMA, by DSM of Holland, PBO sold under the trademark ZYLON® by Toyobo of Tokyo, Japan (pursuant to a license from Dow Chemical, Inc. of Midland, Mich.), KEVLAR® or PROTERA® by E. I. Dupont de Nemours & Company of Chattanooga, Tenn. Other suitable fabrics will occur to one of ordinary skill in the art.

Some suitable substrates are available with an aggressive adhesive coating covered by a release paper. In addition to being aggressive, it is important that the adhesive once cured remains flexible to reduce separation of the disks and substrate during a ballistic event. The substrate of a desired size may be cut and the release paper peeled back to expose the adhesive surface. The disk can then be laid out directly onto the adhesive which retains them in position relative to one another. Because the substrate is flexible and the disks flex about their intersection, pivoting somewhat within the imbricated layout, the combined unit is significantly flexible; on the order of 60% more flexible than the prior art metal plate and coin configuration armor. Alternatively, the pattern may be laid out and the substrate adhered over the top.

The next step is to place another layer of this adhesive coated flexible substrate on the other side of the disks to secure them in a flexible position that does not change when the panel is flexed. The actual position of each disk remains substantially in the same place it was laid. This second layer of adhesive fabric used to envelop the imbricated pattern provides further staying power, thereby reducing the risk that a disk will shift and the body armor will fail.

It has been found that the above-disclosed invention will defeat a level three threat and all lesser threats. Additional layers of the adhesive coated flexible substrate material may be added to either side in any proportion (i.e. it is within the scope and contemplation of the invention to have more substrate layers on one side of the plate than the other side of the plate) in multiple layers to achieve different performance criteria. Some situations benefit from allowing the disks to move slightly during the ballistic event, while others make it desirable that the disk remain as secure in place as possible.

In an alternative embodiment of the invention, a "dry" high tensile strength flexible substrate is provided. It is then coated with a flexible bonding agent, for example, a silicon elastomer resin. The disks may then be laid out as described above. The bonding agent is then cured to flexibly retain the relative locations of the disks. A similarly coated layer can be used to sandwich the plate from the opposite side. It is also within the scope and contemplation of the invention to use one layer with a flexible bonding agent while a facing layer is of the peel and stick variety described above. As used herein, "adhesive impregnated substrate" refers to suitable flexible high tensile strength material having an adhesive disposed on one side, whether commercially available with adhesive in place or coated later as described above.

In yet another embodiment, an adhesive impregnated substrate is created by either above described method and the (sandwiching) layer is non-adhesive and merely coupled to the underlying substrate about the periphery of the plate. This will somewhat degrade the retention of the disk as compared to sandwiching between adhesive layers. Accordingly, this configuration will not survive as many hits and the front layer attached about the periphery serves primarily as a spall shield.

FIG. 4 is a perspective view of a disk. In this embodiment, the disk has a discus shape of varying thickness, ¼" in the center tapering with a uniform slope to ⅛" at the circumferential edge. In an imbricated pattern, edges of adjacent disks will overlap, creating areas of significant thickness having multiple disk layers. Ordinarily, this pattern will not overlap the center, or thickest region, of the disk. Thus, a projectile striking the disk pattern at any point will impact either a singular disk near its thickest region, or multiple layered disks at least as thick, and likely thicker, than the thickest region of the singular disk. Moreover, the slope of the discus shape between areas of varying thickness discourage any perpendicular ballistic impact.

FIG. 5 shows a perspective view of a disk after application of a containment wrap. As noted above, this wrap may be a fiberglass or aramid fiber composite adhered to a substrate which may be a modified epoxy resin. The wrap imparts greater fracture toughness and hardness, reducing disk shatter and disassociation in response to a ballistic event.

FIG. 6 shows a cross section of a disk illustrating its discus shape. The layers of adhesive 22 and containment wrap 24, as noted above, are evident.

FIG. 7 is a perspective view of a disk of an alternative embodiment of the invention. In this embodiment, formation of the disk is substantially as described above, varying only in the slope of the end result. While varying in thickness from the center to the edge, the slope of tapering is not uniform, leaving a more pronounced bulging center having a domed shape. This leaves the surface area extending from the circumference edge to the domed center substantially planar. This embodiment allows for the disks to have a greater overlapped surface area, increasing the surface area in which a projectile would encounter multiple layers of disk. However, the substantially planar region increases the probability of a perpendicular strike. The domed disks can be laid out in an analogous manner to that described above and assembled into body armor capable of defeating level three threats.

FIG. 8 is a side view of the alternative embodiment shown in FIG. 6.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:

A discus shaped disk used in body armor, having a radius, a first inclined surface co-extensive with a segment of the radius and a thickness, wherein the first inclined surface has a substantially uniform downward slope from a center of the disk coextensive with a portion of the radius.

2. The apparatus of claim 1 wherein the disk comprises a ceramic material.

3. The apparatus of claim 1 wherein the fiber induced composite ceramic material comprises alumina and has a hardness of at least 12 GPa, a fracture toughness of at least 3.8 MPa-m$^{1/2}$.

4. The apparatus of claim 1 wherein the disk further comprises a fiber induced ceramic comprising an alumina and toughened metallic oxide composite.

5. The apparatus of claim 4 wherein the toughened metallic oxide is transformation toughened zirconia.

6. The apparatus of claim 5 wherein the transformation toughened zirconia is approximately 12%, by weight, of the disk.

7. The apparatus of claim 1 wherein the disk further comprises a containment wrap coupled to the first inclined surface.

8. The apparatus of claim 7 wherein the containment wrap comprises:

an adhesive substrate coat; and, glass fiber material overlaying the adhesive substrate.

9. The apparatus of claim 7 wherein the containment wrap comprises:

an adhesive substrate coat; and, aramid fiber overlaying the adhesive substrate.

10. The apparatus of claim 1, further comprising:

a plurality of additional disks substantially identical in dimension to the first disk, the plurality of disks arranged in an imbricated pattern;

a tear and cut resistant adhesive substrate adhering the disks in an imbricated pattern.

11. The apparatus of claim 10, wherein the imbricated pattern comprises a plurality of substantially linear horizontal rows of disks.

12. The apparatus of claim 11, further comprising:

a soft body armor backing coupled to the substrate.

13. The apparatus of claim 12, wherein the apparatus extends around a wearer such that the imbricated disk pattern protects the wearer in more than a 180 degree arc.

14. The apparatus of claim 12 wherein the apparatus withstands a level three ballistic event.

15. A disk used in body armor having a radius, a concentric dome coextensive with a portion of the radius, and a substantially flat surface circumferentially surrounding the dome.

16. A method for making body armor to defeat a high-velocity projectile, the method comprising:

providing a plurality of ceramic disks having an inclined surface;

wherein the first inclined surface has a substantially uniform downward slope from a center of the disk coextensive with a portion of the radius;

laying out the plurality of disks in an imbricated pattern on a layout surface;

adhering a high tensile strength substrate to a first side of the imbricated pattern.

17. The method of claim 16, wherein laying out comprises;

placing a subset of the plurality of disks in a substantially straight horizontal row originating from a first horizontal direction;

placing successive overlapping substantially straight horizontal rows originating from the first direction.

18. The method of claim 16, wherein the imbricated pattern comprises;

overlapping each disk upon a successive disk so that each disk tilts from a horizontal plane defined by the layout surface.

19. The method of claim 16, further comprising the step of encompassing a surface of the disks with a containment wrap.

20. The method of claim 16, further comprising the step of adhering a glass fiber overlay to a surface of the disks.

21. The method of claim 16 further comprising the step of adhering an aramid fiber overlay to the surface of the disks.

* * * * *